(12) United States Patent
Hou et al.

(10) Patent No.: US 8,792,940 B2
(45) Date of Patent: Jul. 29, 2014

(54) METHODS FOR HANDLING HANDS-FREE DEVICE BY AUDIO GATEWAY DEVICE WITH SUBSCRIBER IDENTITY CARDS AND SYSTEMS UTILIZING THE SAME

(75) Inventors: Kai-Yuan Hou, Yunlin County (TW); Liang-Yen Lin, Chiayi (TW); Chang-Ching Yan, Pingtung County (TW)

(73) Assignee: Mediatek Inc., Hsin-Chu (TW)

( * ) Notice: Subject to any disclaimer, the term of this patent is extended or adjusted under 35 U.S.C. 154(b) by 1207 days.

(21) Appl. No.: 12/273,614

(22) Filed: Nov. 19, 2008

(65) Prior Publication Data

US 2009/0215491 A1    Aug. 27, 2009

Related U.S. Application Data

(60) Provisional application No. 61/031,769, filed on Feb. 27, 2008.

(51) Int. Cl.
*H04B 1/38* (2006.01)

(52) U.S. Cl.
USPC ............... 455/558; 455/569.1; 455/41.2

(58) Field of Classification Search
USPC ............ 455/41.2, 426.1, 557, 569.1, 344, 455/556.1, 556.2, 575.2, 41.3, 345, 462, 455/428, 422.1; 370/329, 401, 331; 379/430; 381/74

See application file for complete search history.

(56) References Cited

U.S. PATENT DOCUMENTS

| | | | |
|---|---|---|---|
| 6,285,869 B1* | 9/2001 | Shannon et al. | 455/411 |
| 7,233,808 B2* | 6/2007 | Mooney et al. | 455/557 |
| 7,555,318 B2* | 6/2009 | Seshadri et al. | 455/569.1 |
| 7,558,529 B2* | 7/2009 | Seshadri et al. | 455/41.2 |
| 7,844,055 B2* | 11/2010 | Mukherjee et al. | 380/250 |
| 8,085,891 B2* | 12/2011 | Owen | 375/354 |
| 2003/0153356 A1* | 8/2003 | Liu | 455/558 |
| 2003/0200445 A1* | 10/2003 | Park | 713/185 |
| 2004/0204168 A1* | 10/2004 | Laurila | 455/569.1 |
| 2005/0286466 A1* | 12/2005 | Tagg et al. | 370/329 |
| 2006/0166716 A1 | 7/2006 | Seshadri et al. | |
| 2006/0166718 A1* | 7/2006 | Seshadri et al. | 455/575.2 |
| 2006/0234693 A1* | 10/2006 | Isidore et al. | 455/422.1 |
| 2006/0291483 A1* | 12/2006 | Sela | 370/401 |
| 2007/0105548 A1* | 5/2007 | Mohan et al. | 455/426.1 |
| 2007/0275745 A1* | 11/2007 | Owen | 455/502 |
| 2008/0220825 A1* | 9/2008 | Wu | 455/569.1 |

FOREIGN PATENT DOCUMENTS

EP    1 513 327    3/2005

* cited by examiner

*Primary Examiner* — April G Gonzales
(74) *Attorney, Agent, or Firm* — McClure, Qualey & Rodack, LLP

(57) ABSTRACT

A method for handling a Hands-Free device by an Audio Gateway device with a first subscriber identity card and a second subscriber identity card, executed by a micro-processing unit (MCU) of a Baseband chip, is provided. A command is received from the Hands-Free device, wherein the Hands-Free device issues the first command to request a status report of the Audio Gateway device. The status report is provided to the Hands-Free device via a result code which comprises a plurality of integrated status indicators corresponding to statuses of the first subscriber identity card and the second subscriber identity card.

20 Claims, 9 Drawing Sheets

US 8,792,940 B2

METHODS FOR HANDLING HANDS-FREE DEVICE BY AUDIO GATEWAY DEVICE WITH SUBSCRIBER IDENTITY CARDS AND SYSTEMS UTILIZING THE SAME

CROSS-REFERENCE TO RELATED APPLICATIONS

This application claims the benefit of U.S. Provisional Application No. 61/031,769, filed on Feb. 27, 2008, the entirety of which is incorporated by reference herein.

BACKGROUND OF THE INVENTION

1. Field of the Invention

The invention relates to a method for handling a Hands-Free device, and more particularly to a method for handling a Hands-Free device by an Audio Gateway device with multiple subscriber identity cards.

2. Description of the Related Art

Currently, the Global System for Mobile communication (GSM) standard is the popular standard for mobile phones in the world. The GSM standard, standardized by the European Telecommunication Standards Institute (ETSI) is a cellular network structure and a Time Division Multiple Access (TDMA) system. For a carrier frequency, the TDMA system will divide a frame into eight time slots, wherein each time slot is used to transmit a channel data for a subscriber. In addition, the General Packet Radio Service (GPRS) technology is one of the available technologies of a GSM network. The GPRS technology utilizes the unused channels in the GSM network to provide moderate speed data transmission. The Wideband Code Division Multiple Access (W-CDMA) is a wideband spread-spectrum mobile air interface that utilizes the direct-sequence spread spectrum method of asynchronous code division multiple access to achieve higher data transmission speeds and support more users when compared to the implementation of the time division multiplexing (TDMA) system used by 2G GSM networks. The Time Division-Synchronous Code Division Multiple Access (TD-SCDMA) system is another type of 3G mobile telecommunications standard.

A dual SIM mobile phone is a phone with two or more Subscriber Identity Modules (SIMs), which correspond to different telephone numbers. The dual SIM mobile phone allows a user to use two communication services without carrying two phones at the same time. For example, the same mobile phone may be used for business and private use with separate numbers and bills, thus providing convenience to mobile phone users. Moreover, a hands-free device is an apparatus used with cell phones that permits a user to talk on the phone without holding it. However, it is difficult to handle interactions between the hands-free device and the dual SIMs.

BRIEF SUMMARY OF THE INVENTION

Methods for handling a Hands-Free device by an Audio Gateway device with a first subscriber identity card and a second subscriber identity card and the systems utilizing the same are provided. An exemplary embodiment of a method for handling a Hands-Free device by an Audio Gateway device with a first subscriber identity card and a second subscriber identity card is executed by a micro-processing unit (MCU) of a Baseband chip. A command is received from the Hands-Free device, wherein the Hands-Free device issues the command to request a status report of the Audio Gateway device. The status report is provided to the Hands-Free device via a result code which comprises a plurality of integrated status indicators corresponding to statuses of the first subscriber identity card and the second subscriber identity card.

Furthermore, another exemplary embodiment of a method for handling a Hands-Free device by an Audio Gateway device with a first subscriber identity card and a second subscriber identity card, is also executed by a micro-processing unit (MCU) of a Baseband chip. An event signal indicating that a status corresponding to the first subscriber identity card or the second subscriber identity card has been updated is obtained. A status update report is provided to the Hands-Free device via an unsolicited result code which comprises a status indicator corresponding to the updated status.

Moreover, an exemplary embodiment of a system comprises a first subscriber identity card, a second subscriber identity card and a processor. The processor provides a status report to the Hands-Free device via a result code in response to a request issued by the Hands-Free device, wherein the result code comprises a plurality of integrated status indicators corresponding to statuses of the first subscriber identity card and the second subscriber identity card.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
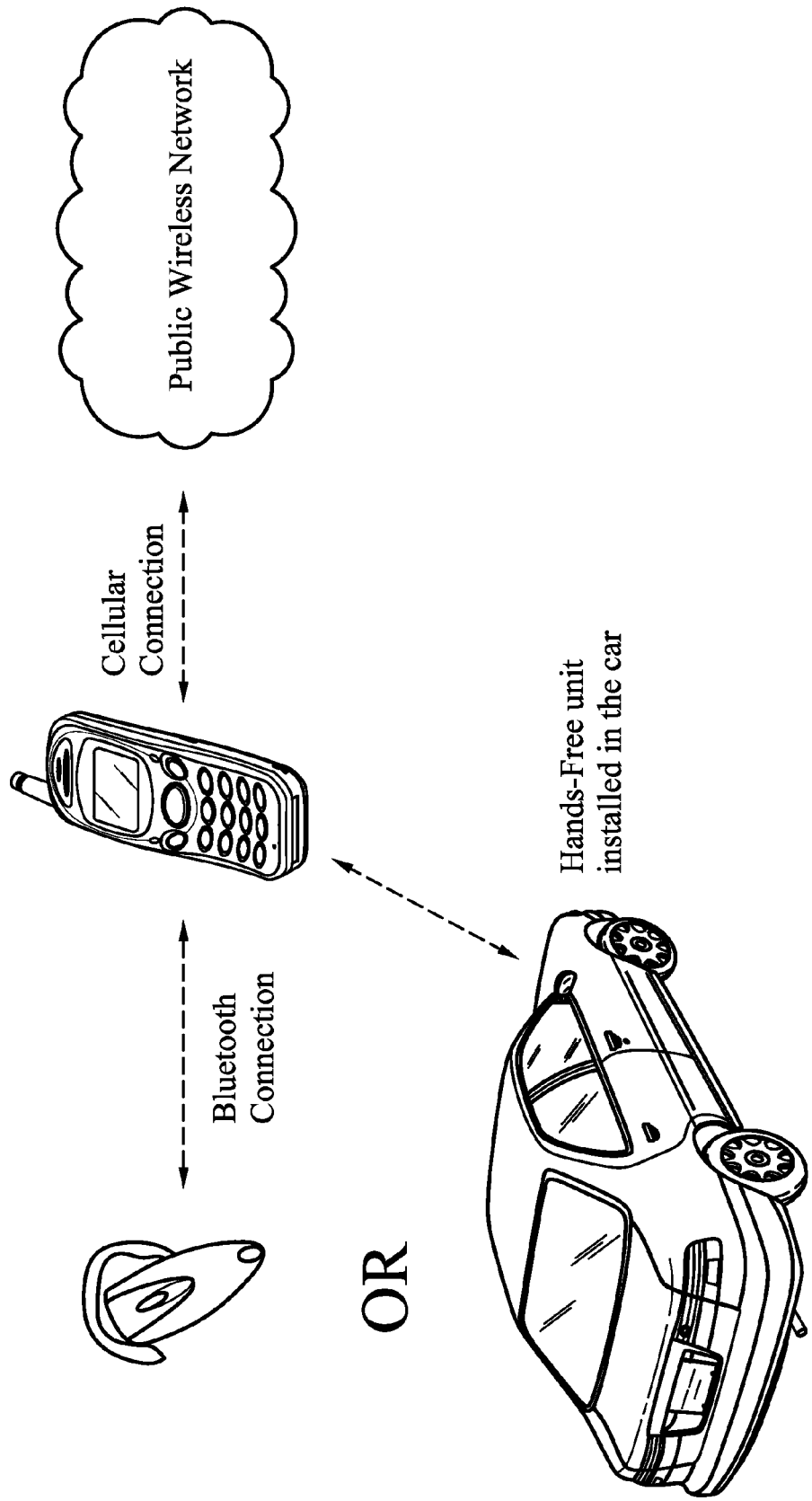
FIG. 1 shows a diagram illustrating a Bluetooth® Link providing a wireless means for both remote control of the mobile station by a Hands-Free device and voice connections therebetween.

The following description is of the best-contemplated mode of carrying out the invention. This description is made for the purpose of illustrating the general principles of the invention and should not be taken in a limiting sense. The scope of the invention is best determined by reference to the appended claims.

A subscriber identity module (SIM) card typically contains user account information, an international mobile subscriber identity (IMSI) and a set of SIM application toolkit (SAT) commands and provides storage space for phone book contacts. A micro-processing unit (MCU) of the Baseband chip (simply referred to as a Baseband MCU hereinafter) may interact with MCUs of the SIM cards (each simply referred to as a SIM MCU hereinafter) to fetch data or SAT commands from the plugged in SIM cards. A mobile station program is immediately activated after plugging in the SIM card. SIM cards may also be programmed to display custom menus for personalized services.

A universal SIM (USIM) card is inserted into a mobile station for universal mobile telecommunications system (UMTS) (also called 3G) telephony communication. The USIM card stores user account information, an IMSI, authentication information and a set of USIM Application Toolkit (USAT) commands and provides storage space for text messages and phone book contacts. A Baseband MCU may interact with an MCU of the USIM card (each simply referred to as a USIM MCU hereinafter) to fetch data or SAT commands from the plugged in USIM cards. The phone book on the USIM card is greatly enhanced when compared to the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS. A mobile station is immediately programmed after plugging in the USIM card.

A removable User Identity Module (R-UIM) or a Code Division Multiple Access (CDMA) Subscriber Identity Module (CSIM) card has been developed for a CDMA mobile station and is equivalent to the GSM SIM and 3G USIM except that it is capable of working in CDMA networks. The R-UIM or the CSIM card is physically compatible with the GSM SIM card, and provides similar security mechanisms for the CDMA system. The IMSI is a unique number associated with a global system for mobile communication (GSM) or a universal mobile telecommunications system (UMTS) network user. The IMSI may be sent by a mobile station to a GSM or UMTS network to acquire other details of the mobile user in the Home Location Register (HLR) or as locally copied in the Visitor Location Register (VLR). An IMSI is typically 15 digits long, but may be shorter (for example MTN South Africa's IMSIs are 14 digits). The first 3 digits are the Mobile Country Code (MCC), and they are followed by the Mobile Network Code (MNC), and either 2 digits (European standard) or 3 digits (North American standard). The remaining digits are the mobile subscriber identification number (MSIN) for a GSM or UMTS network user.

A hands-Free Profile (HFP) specification defines a minimum set of functions such that a mobile station (MS) can be used in conjunction with a Hands-Free device (e.g. installed in the car or represented by a wearable device such as a headset), as shown in FIG. 1. A Bluetooth® Link provides a wireless means for both remote control of the mobile station by the Hands-Free device and voice connections between them. Furthermore, HFP also defines two roles for the audio gateway (AG) and hands-free unit (HF). The AG is for both audio input and output. Typical devices acting as AG are the mobile stations. The HF acts as the AG's remote audio input and output device. The HF also provides some remote control means (ex: dial last dialed number out, answer incoming call, etc.) and the signaling is AT command based.

An AG requires reporting of its statuses to an HF to facilitate subsequent functions. The HFP defines several status indicators such as "service", "call", "callsetup", "callheld", "signal", "roam" and "battchg". Specifications of each indicator and possible values thereof are listed below.

service: Service availability indication, where:
    <value>=0 implies no service. No Home/Roam network is available.
    <value>=1 implies presence of service. Home/Roam network is available.

call: Standard call status indicator, where:
    <value>=0 means no call is active.
    <value>=1 means a call is active.

callsetup: Bluetooth proprietary call set up status indicator, where:
    <value>=0 means no call is currently being set up.
    <value>=1 means an incoming call process is ongoing.
    <value>=2 means an outgoing call set up is ongoing.
    <value>=3 means a remote party is being alerted of an outgoing call.

callheld: Bluetooth proprietary call hold status indicator, where:
    <value>=0 means no call is being held.
    <value>=1 means that a call has been placed on hold or active/held calls swapped when the AG has both an active call and a held call.
    <value>=2 means a call is on hold and there are no active call.

signal: Signal strength indicator, where:
    <value>=ranges from 0 to 5.

roam: Roaming status indicator, where:
    <value>=0 means roaming is not active.
    <value>=1 means a roaming is active.

battchg: Battery charge indicator of an AG, where:
    <value>=ranges from 0 to 5.

Figure 2:
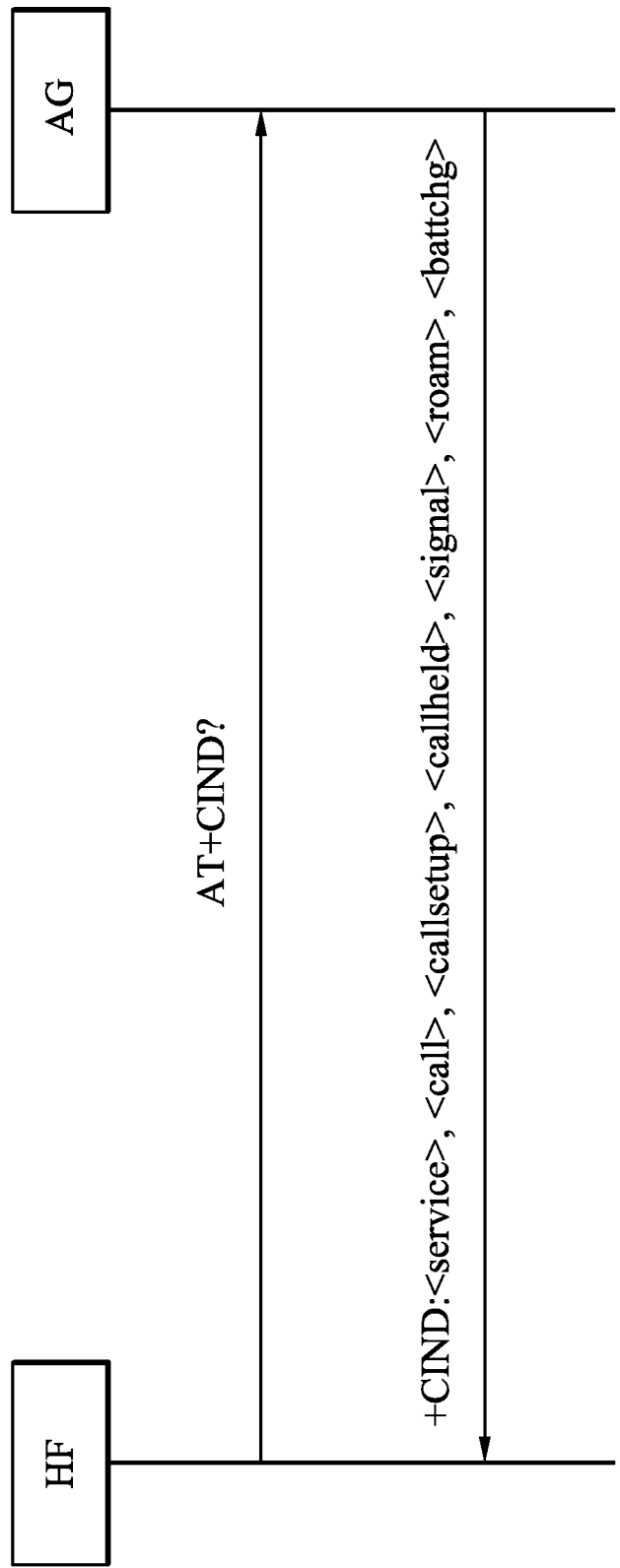
FIG. 2 shows a sequence diagram illustrating the message exchange between a hands-free (HF) and a audio gateway (AG) when the HF issues an AT command to query all statuses of the AG.

Several mechanisms are employed for status reporting between an HF and an AG. In one mechanism, referring to FIG. 2, the HF issues an AT command such as "AT+CIND?" to query all statuses of the AG, and then, the AG responses to the HF with a result code containing all status indicators and values thereof, such as "+CIND:<service>, <call>, <callsetup>, <callheld>, <signal>, <roam>, <battchg>". After receiving response values, the HF accordingly configures itself.

Figure 3:
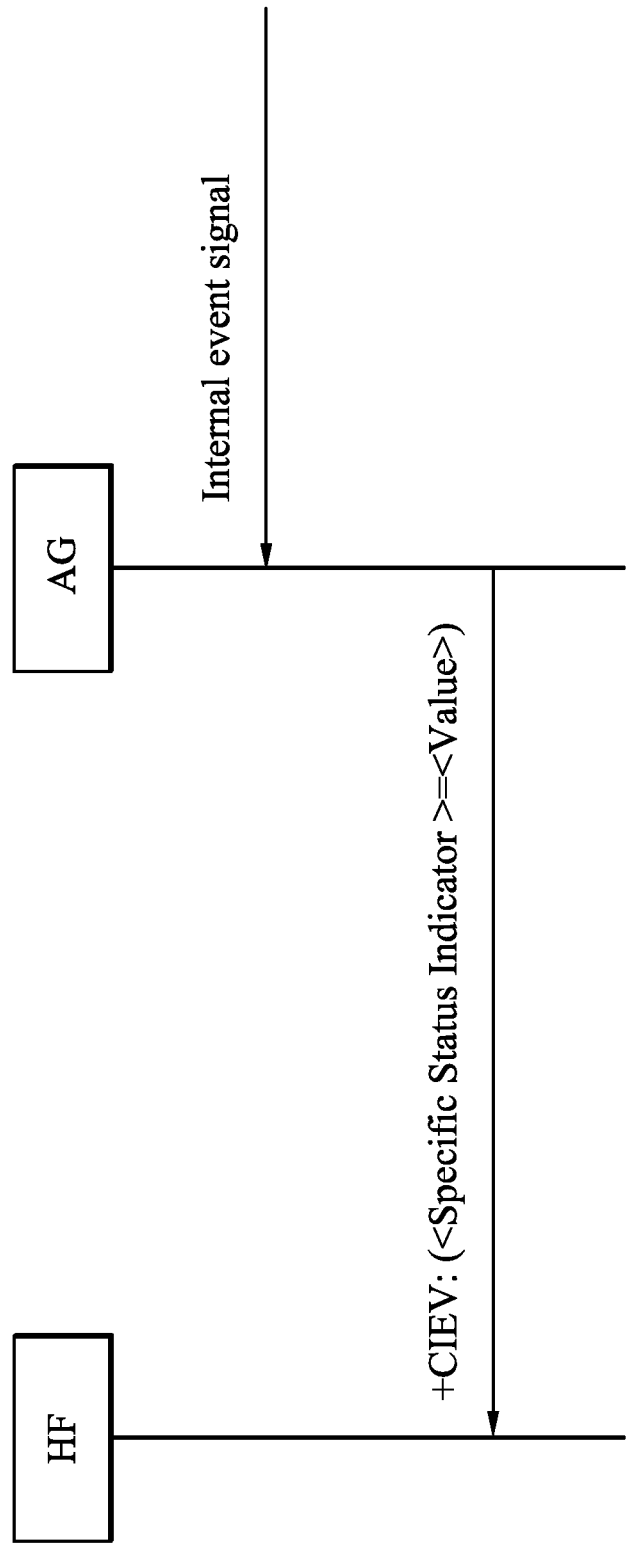
FIG. 3 shows a sequence diagram illustrating the message exchange between an HF and an AG when the AG detects an internal event.

In another mechanism, referring to FIG. 3, when detecting an internal event signal, for example, indicating that an incoming call request is received, signal strength status changes or others, the AG reports the change of a status via an unsolicited result code containing a status indicator, such as "+CIEV: (<Specific Status Indicator Name>=<Value>)". The unsolicited result code is utilized to indicate occurrence of an event not directly associated with an issuance of a command by the HF. After receiving up-to-date status values, the HF accordingly configures itself. For an example, when receiving a "callsetup" indicator indicating that an incoming call request has been received by the AG, the HF may configure an operation mapping to a button installed on the HF, thereby enabling to instruct the AG to answer the call by issuing an AT command "ATA (Answer)" upon detecting the button being pressed. For another example, when receiving a "call" indicator indicating that there is no active call, the HF may configure an operation mapping to the button, thereby instructing the AG to dial a last dialed number (LDN) by issuing an AT command "AT+BLDN" upon the button being pressed. For still another example, when receiving a "callsetup" indicator indicating that an outgoing call set up is ongoing, the HF may configure an operation mapping to the button, thereby instructing the AG to abort the outgoing call by issuing an AT command "ATH" upon the button being pressed.

Figure 4:
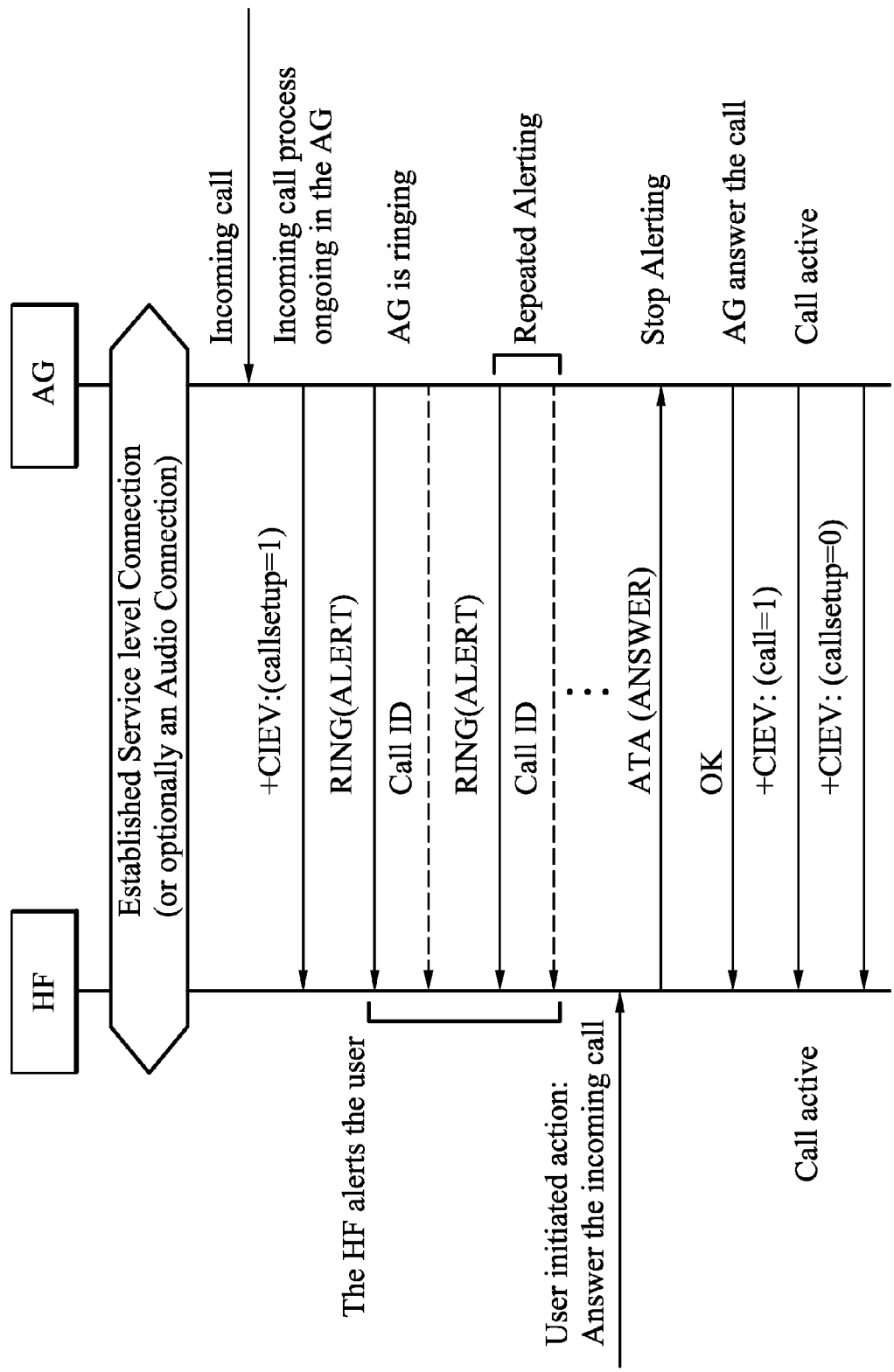
FIG. 4 shows a sequence diagram illustrating message exchange between an AG and an HF for answering an incoming call.

FIG. 4 shows a sequence diagram illustrating an exemplary message exchange between an AG and an HF for answering an incoming call. A service level connection or optionally an audio connection is first established between the AG the HF. When receiving an incoming call request, the AG issues an unsolicited result code "+CIEV: (callsetup=1)" to inform the HF that an incoming call process is ongoing. During the incoming call process, the AG provides the ring signal and caller identification (caller ID) information to the HF. The HF accordingly alerts the user and configures an operation mapping to a button installed on the HF. An AT command "ATA (Answer)" is issued to instruct the AG to answer the incoming call upon detecting the button being pressed. In addition to acknowledging the incoming call request, the AG further issues two unsolicited result codes "+CIEV: (call=1)" and "+CIEV: (callsetup=0)" to inform the HF that a call is active in the AG and that no call is currently being set up in the AG.

Figure 5A:
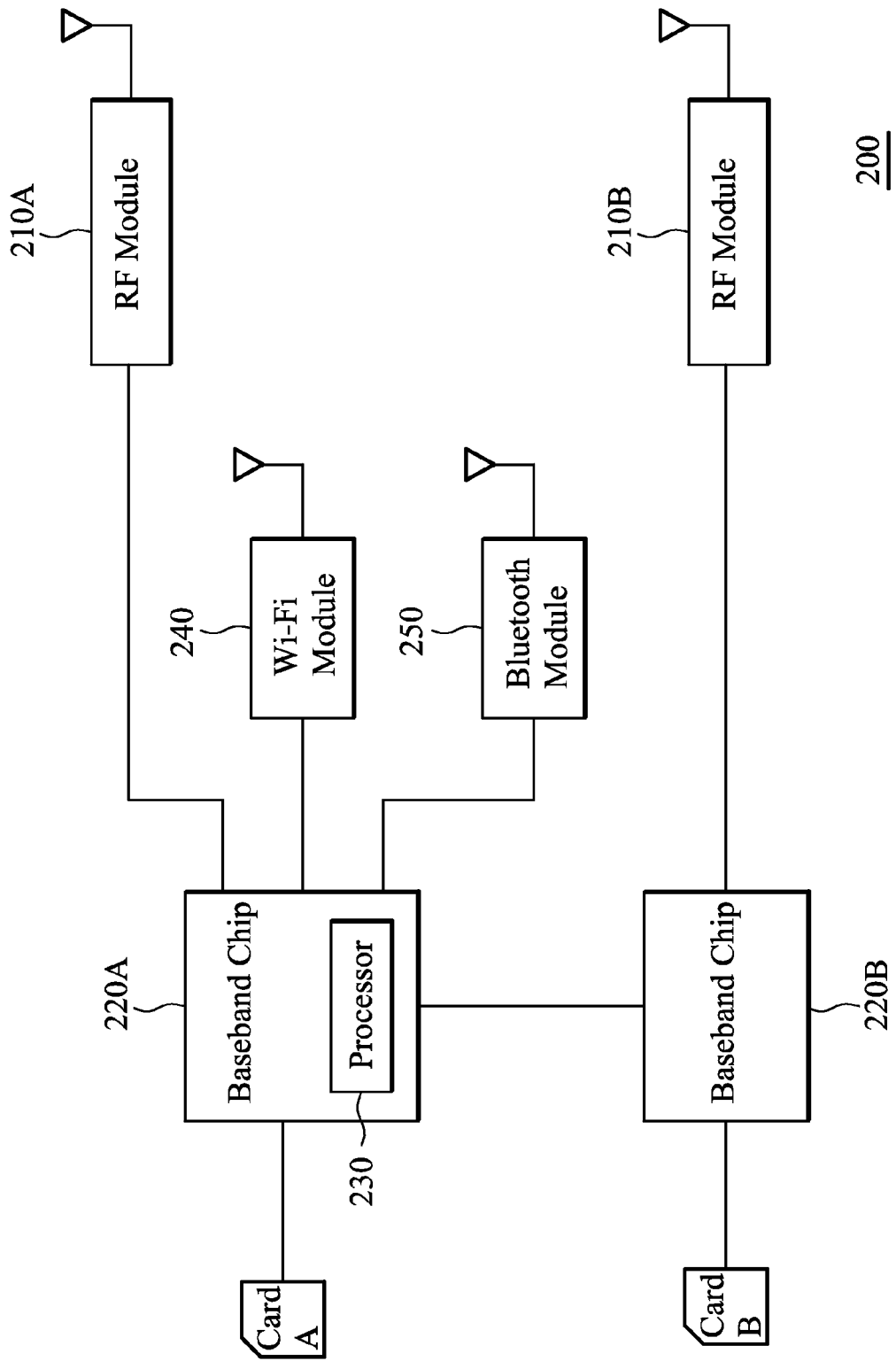
FIG. 5A shows the hardware architecture of an AG according to an embodiment of the invention.

FIG. 5A shows the hardware architecture of an AG 200 according to an embodiment of the invention. The AG 200 is a mobile station comprising two RF modules 210A and 210B, two Baseband chips 220A and 220B, a Wi-Fi module 240 and a Bluetooth module 250, wherein the RF module 210A is coupled to the Baseband chip 220A and the RF module 210B is coupled to the Baseband chip 220B. The Wi-Fi module 240 and the Bluetooth module 250 are coupled to the Baseband chip 220A, wherein the Wi-Fi module 240 may send Session Initiation Protocol (SIP) messages to an Internet network to disconnect/connect and hold/retrieve a Voice-over-Internet protocol (VOIP) call. Two subscriber identity cards A and B may be plugged into two sockets of the AG 200 connecting to the Baseband chips 220A and 220B, respectively. One of the subscriber identity cards A and B may be a SIM, USIM, R-UIM or CSIM card, which is provided by a particular network operator. The AG 200 can therefore simultaneously camp on two cells (base stations) provided by either the same network operator or different network operators for the plugged in cards A and B and operate in stand-by/idle modes, or even dedicated modes, using different RF modules and Baseband chips. The Baseband chip 220A may read data from the subscriber identity card A and write data to the subscriber identity card A. The Baseband chip 220B may read data from the subscriber identity card B and write data to the subscriber identity card B. Furthermore, the Baseband chip 220A may be a master device for the AG 200, and the Baseband chip 220A comprises a processor 230 for controlling the communications between itself and the Baseband chip 220B, connecting to the Internet to enable a wireless voice-application (such as a VOIP call) via the Wi-Fi module 240, controlling the interactions between the AG 200 and a Bluetooth handset/device (not shown) via the Bluetooth module 250, or others. A further processor (not shown) may be provided in the Baseband chip 220B to coordinately operate with the processor 230 of the Baseband 220A to improve performance.

Figure 5B:
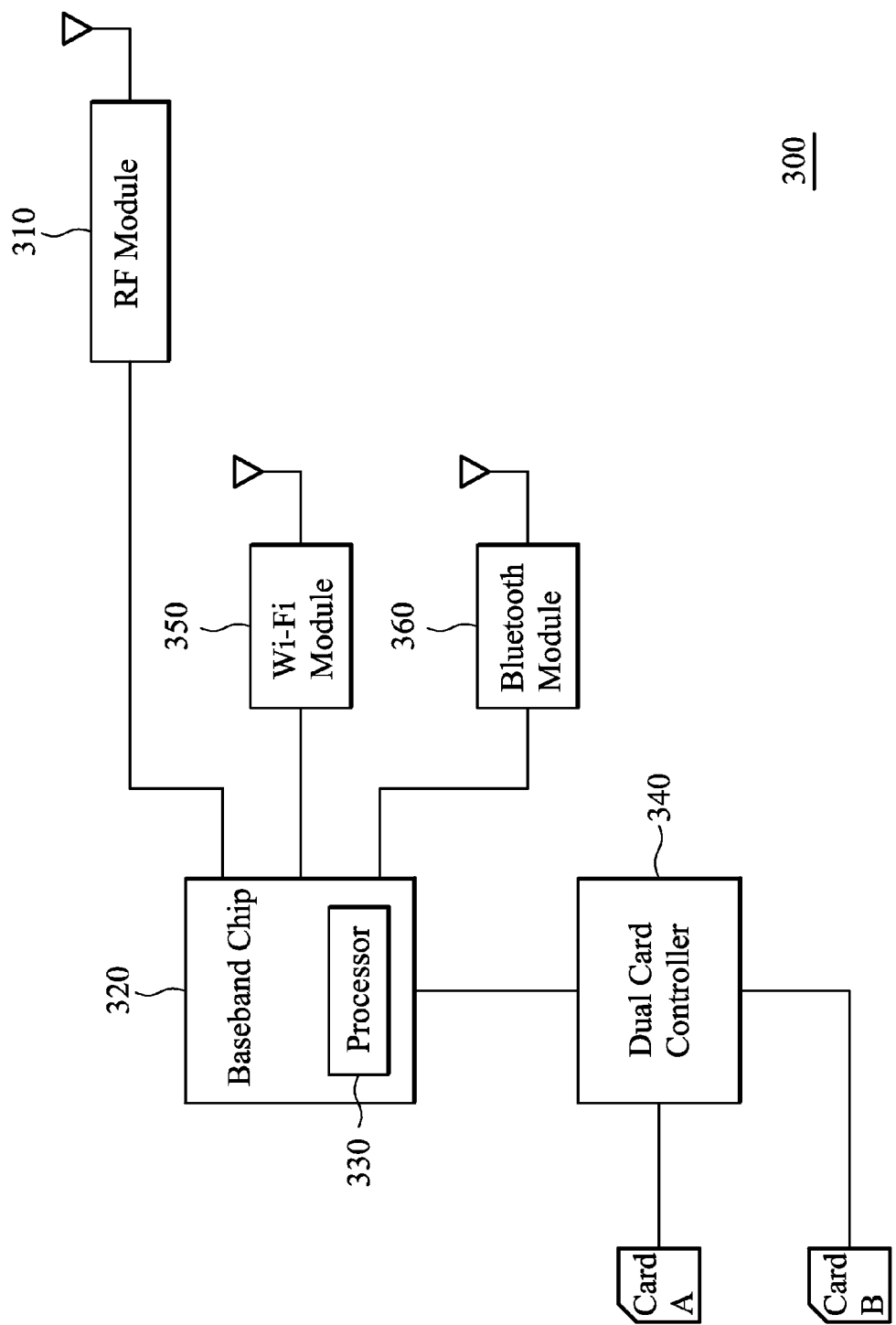
FIG. 5B shows the hardware architecture of an AG according to another embodiment of the invention.

FIG. 5B shows the hardware architecture of an AG 300 according to another embodiment of the invention. The AG 300 is a mobile station comprising a single RF module 310, a Baseband chip 320, a dual card controller 340, a Wi-Fi module 350 and a Bluetooth module 360, wherein two subscriber identity cards A and B may be plugged into two sockets of the AG 300 connecting to the dual card controller 340. Those skilled in the art may practice the Baseband chip 320 having the dual card controller 340 inside. One of the subscriber identity cards A and B may be a SIM, USIM, R-UIM or CSIM card, which is provided by a particular network operator. The AG 300 can therefore camp on two cells provided by either the same network operator or different network operators for the plugged in cards A and B and operate in stand-by/idle modes, or even dedicated modes, using the same RF module and Baseband chip. The dual card controller 340 is coupled/connected between the Baseband chip 320 and the subscriber identity cards A and B. Furthermore, the Baseband chip 320 comprises a processor 330 for controlling the communications between the subscriber identity cards A and B and the RF module 310, connecting to the Internet to enable a wireless voice-application (such as a VOIP call) via the Wi-Fi module 350, controlling the interactions between the AG 300 and a Bluetooth handset/device (not shown) via the Bluetooth module 360, or others. Moreover, the processor 330 of the Baseband chip 320 may read data from the subscriber identity card A or B via the dual card controller 340, and may also write data to the subscriber identity card A or B via the dual card controller 340.

A RF module (e.g. 210A or 210B of FIG. 5A, or 310 of FIG. 5B) receives wireless radio frequency signals, converts the received signals to baseband signals to be processed by a corresponding Baseband chip (e.g. 220A or 220B of FIG. 5A, or 320 of FIG. 5B), or receives baseband signals from the Baseband chip and converts the received signals to wireless radio frequency signals to be transmitted to a peer device. The RF module may comprise a plurality of hardware devices to perform radio frequency conversion. For example, the RF module may comprise a mixer to multiply the baseband signals with a carrier oscillated in the radio frequency of the wireless communication system, wherein the radio frequency may be, for example, 900 MHz or 1800 MHz for a global system for mobile communication (GSM), or 1900 MHz for a Universal Mobile Telecommunications System (UMTS). The Baseband chip further converts the baseband signals to a plurality of digital signals, and processes the digital signals, and vice versa. The Baseband chip may also comprise a plurality of hardware devices to perform baseband signal processing. The baseband signal processing may comprise analog to digital conversion (ADC), digital to analog conversion (DAC), gain adjustments, modulation/demodulation, encoding/decoding, and so on.

Figure 6:
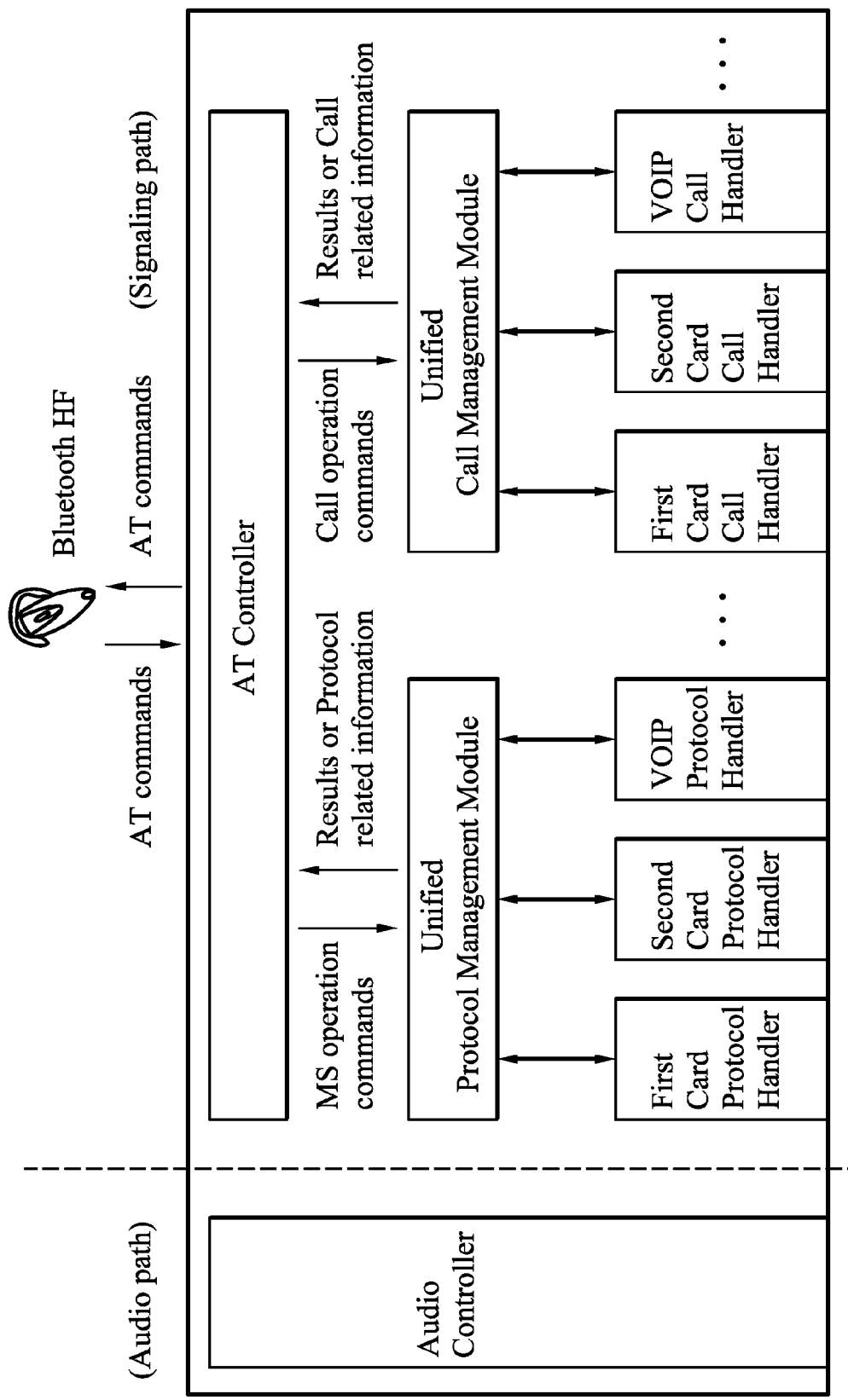
FIG. 6 shows a block diagram illustrating the software architecture for handling a Bluetooth HF device by an AG with dual subscriber identity cards according to an embodiment of the invention.

FIG. 6 shows a block diagram illustrating the software architecture for handling a Bluetooth HF device by an AG with dual subscriber identity cards according to an embodiment of the invention. When handling signals, the AG provides several software modules which are executed by a processor thereof (e.g. 230 of FIG. 5A or 330 of FIG. 5B). As shown in FIG. 6, a unified protocol management module is used to control the communications between an AT controller and a plurality of protocol handlers comprising the first and second subscriber identity card protocol handlers, a VOIP protocol handler and so on, and a unified call management module is used to control the communications between the AT controller and a plurality of call handlers comprising the first and second subscriber identity card call handlers, a VOIP call handler and so on. When receiving the mentioned AT commands from the HF, the AT controller is responsible for parsing the mentioned AT commands and accordingly issues MS and/or call operation commands to the unified protocol and/or call management module to perform specific operations and/or protocol message exchange to the AG When receiving the returned results in response to the issued MS or call operation commands, or MS/call related signals from the unified protocol or call management module, the AT controller is responsible for realizing the returned results or mobile station/call related signals and accordingly issues AT commands to the HF. It is to be understood that the unified protocol and call management modules may be integrated into a single software module.

The AG camps on the same or different cellular base stations (BSs) for the equipped dual subscriber identity cards. When receiving an incoming call request from a cellular BS corresponding to one subscriber identity card, the protocol and/or call management module may cache information regarding the cellular BS and/or subscriber identity card with the incoming call request. After that, when receiving an AT command "ATA (Answer)" from the HF, the protocol and/or call management module perform(s) relevant operations with a specific cellular BS and/or a specific subscriber identity card to acknowledge the incoming request according to the cached information. The protocol and/or call management module may also cache information regarding an active call for communicating with a specific cellular BS and a specific subscriber identity card. Subsequently, when receiving an AT command "ATH" or "AT+CHLD" from the HF, the protocol and/or call management module perform(s) relevant operations with a specific cellular BS and/or a specific subscriber identity card to hold the active call according to the cached information. Moreover, the protocol and/or call management module may cache information regarding the last dialed number (LDN) with a specific subscriber identity card. When receiving an AT command "AT+BLDN" from the HF, the protocol and/or call management module performs relevant operations with a specific subscriber identity card to make an outgoing call to the AG with the LDN according to the cached information.

In order to coordinate status reporting for dual subscriber identity cards, the protocol or call management module refers to situations relating to both subscriber identity cards and accordingly directs the AT controller to issue an unsolicited result code to the HF for updating a status indicator or all status indicators of the HF. For an example, the AT controller issues an unsolicited result code "+CIEV: (signal=0)" to the HF when signal strengths of signals from both camped on cellular BS are under a threshold. For another example, an unsolicited result code "+CIEV: (service=0)" is issued by the AT controller when detecting no service relating to both subscriber identity cards. For still another example, the AT controller issues an unsolicited result code "+CIEV: (call=1)" to the HF when an active call corresponding to either the first or second subscriber identity card is present, otherwise, the AT controller issues an unsolicited result code "+CIEV: (call=0)" to the HF. For still another example, an unsolicited result code "+CIEV: (callsetup=1)" is issued to the HF when an incoming call process is ongoing for either the first or second subscriber identity card. For still another example, an unsolicited result code "+CIEV: (callsetup=2)" is issued to the HF when an outgoing call set up is ongoing for either the first or second subscriber identity card. For still another example, an unsolicited result code "+CIEV: (callheld=1)" is issued to the HF when an active call is placed on hold for either the first or second subscriber identity card.

Figure 7:
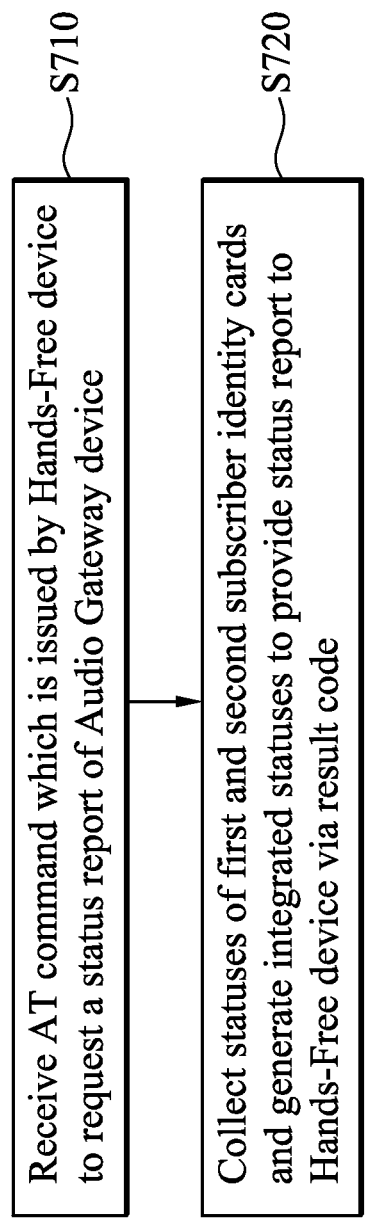
FIG. 7 shows a flow chart illustrating a method for handling a Hands-Free device by an Audio Gateway device with a first subscriber identity card and a second subscriber identity card according to an embodiment of the invention.

FIG. 7 shows a flow chart illustrating a method for handling a Hands-Free device by an Audio Gateway device with a first subscriber identity card and a second subscriber identity card, which is performed when executing software/firmware code by a processor of the Audio Gateway device (e.g. 230 of FIG. 5A or 330 of FIG. 5B), according to an embodiment of the invention. First, the processor may receive an AT command (such as "AT+CIND?") which is issued by the Hands-Free device to request a status report of the Audio Gateway device (step S710). Next, the processor may collect the statuses of the first and second subscriber identity cards and accordingly generate integrated statuses to provide the status report to the Hands-Free device via a result code (step S720), wherein the result code comprises a plurality of integrated status indicators indicating the integrated statuses. For an example, the result code may comprise a status indicator (such as "service=0") to indicate that no service is available when no access network is being camped on by any of the first and second subscriber identity cards. For another example, the result code may comprise a status indicator (such as "service=1") to indicate that a service is available when at least an access network is being camped on by at least one of the first and second subscriber identity cards. For still another example, the result code may comprise a status indicator (such as "call=0") to indicate that no call is active for any of the first and second subscriber identity cards. For still another example, the result code may comprise a status indicator (such as "call=1") to indicate that a call is active for the first or second subscriber identity card. For still another example, the result code may comprise a status indicator (such as "callsetup=0") to indicate that no call is currently processing when no incoming or outgoing call process is being set up for any of the first and second subscriber identity cards. For still another example, the result code may comprise a status indicator (such as "callsetup=1, 2 or 3") to indicate that a call is being processed when an incoming or outgoing call process is set up for the first or second subscriber identity card. For still another example, the result code may comprise a status indicator (such as "callheld=0") to indicate that no call is held for any of the first and second subscriber identity cards. It is to be understood that, by utilizing the mentioned status reporting coordination, the HF device does not require further modifications with consideration of such reported status corresponds to which subscriber identity cards or Wi-Fi module, resulting in increased compatibility.

Figure 8:
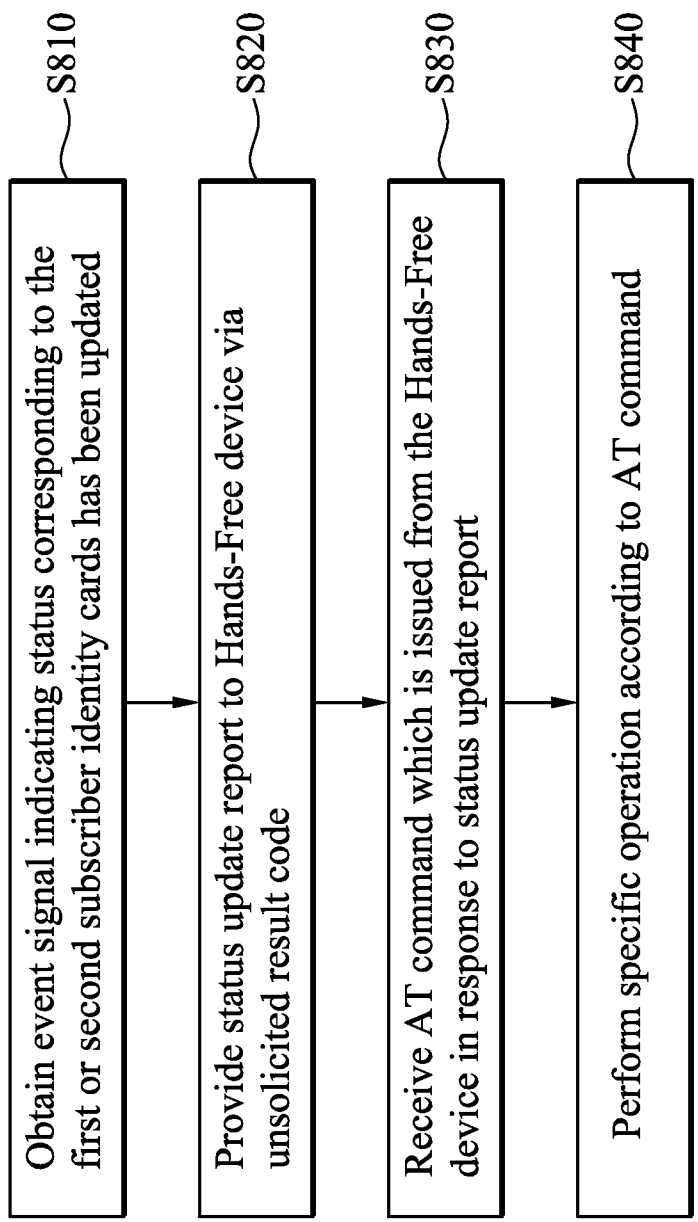
FIG. 8 shows a flow chart illustrating a method for handling a Hands-Free device by an Audio Gateway device with a first subscriber identity card and a second subscriber identity card according to another embodiment of the invention.

FIG. 8 shows a flow chart illustrating a method for handling a Hands-Free device by an Audio Gateway device with a first subscriber identity card and a second subscriber identity card, which is performed when executing software/firmware code by a processor of the Audio Gateway device (e.g. 230 of FIG. 5A or 330 of FIG. 5B), according to another embodiment of the invention. First, the processor may obtain an event signal indicating that a status corresponding to the first or second subscriber identity cards has been updated (step S810). Next, the processor may provide a status update report to the Hands-Free device via an unsolicited result code, wherein the unsolicited result code comprises a status indicator corresponding to the updated status (step S820). It is to be understood that, after receiving the status update report, the Hands-Free device may configure a specific operation mapping to a button installed on the Hands-Free device, so as to issue an AT command to the Audio Gateway device after the button is pressed. Next, the processor may receive the AT command from (or instructed by) the Hands-Free device (step S830) and perform an operation according to the AT command (step S840). For an example, if the status indicator indicates that an incoming call request has been received from a cell that one specific subscriber identity card camps on, the processor may perform an operation to answer an incoming call via the same cell in response to the incoming call request after receiving an AT command from (or instructed by) the Hands-Free device. It is to be understood that information regarding that the incoming call request relates to which subscriber identity card may be cached in a memory device upon receipt of the incoming call request. For another example, if the status indicator indicates that no call is active for any of the first and second subscriber identity cards, the processor may perform an operation to dial a last dialed number via a preferred subscriber identity card or the last dialed subscriber identity card after receiving an AT command from (or instructed by) the Hands-Free device. It is to be understood that information regarding the preferred subscriber identity card may be cached in a volatile or non-volatile memory device. Or, information regarding the last dialed subscriber identity card may be cached in a memory device upon the last dialing. For still another example, if the status indicator indicates that there is an outgoing call via one of the first and second subscriber identity cards, the processor may perform an operation to abort the outgoing call via the subscriber identity card making the outgoing call after receiving an AT command from (or instructed by) the Hands-Free device. It is to be understood that information regarding which subscriber identity card is making the outgoing call may be cached in a memory device for future aborting.

Furthermore, if the status indicator indicates that there is an active call for the first subscriber identity card and there is a waiting call or a held call for the second subscriber identity card, the processor may perform an operation to release the active call via the first subscriber identity card and retrieve the waiting or held call via the second subscriber identity card after receiving an AT command "AT+CHLD=1" from (or instructed by) the Hands-Free device, or may perform an operation to hold the active call via the first subscriber identity card and retrieve the waiting or held call via the second subscriber identity card after receiving an AT command "AT+CHLD=2" from (or instructed by) the Hands-Free device. It is to be understood that information indicating an active call for the first subscriber identity card and a waiting call or a held call for the second subscriber identity card may be cached in a memory device upon generation of the active call and the waiting/held call. In addition, for VOIP, if the status indicator indicates that there is an active call for the first or second subscriber identity card and there is a waiting/held VOIP call through the Internet, the processor may perform an operation to hold or release the active call via the first or second subscriber identity card and retrieve the VOIP call by sending SIP messages to the Internet via a Wi-Fi module (e.g. 240 of FIG. 5A or 350 of FIG. 5B). It is to be understood that information indicating an active call for the first or second subscriber identity card and a waiting call or a held VOIP call may be cached in a memory device upon generation of the active call and the waiting/held call. It is to be understood that, by utilizing the mentioned integrated AT command execution, the HF device does not require further modifications with consideration of such AT commands are issued to which subscriber identity cards or Wi-Fi module, resulting in increased compatibility.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for handling a Hands-Free device by an Audio Gateway device with a first inserted subscriber identity card and a second inserted subscriber identity card, comprising:
    receiving a command from the Hands-Free device, wherein the Hands-Free device issues the command to request a status report of the Audio Gateway device;
    collecting a first status of the first subscriber identity card for the received command;
    collecting a second status of the second subscriber identity card for the received command;
    generating an integrated status indicator according to the collected first and second statuses; and
    providing the status report to the Hands-Free device via a result code which comprises the integrated status indicator.

2. The method as claimed in claim 1, wherein the integrated status indicator indicates that no service is available when no access network is being camped on by any of the first subscriber identity card and the second subscriber identity card, and indicates that a service is available when at least an access network is being camped on by at least one of the first subscriber identity card and the second subscriber identity card.

3. The method as claimed in claim 1, wherein the integrated status indicator indicates that there is no active call when no call is active for any of the first subscriber identity card and the second subscriber identity card, and indicates that there is an active call when a call is active for the first subscriber identity card or the second subscriber identity card.

4. The method as claimed in claim 1, wherein the integrated status indicator indicates that no call is processing when no incoming or outgoing call process is set up for any of the first subscriber identity card and the second subscriber identity card, and indicates that there is a call is being processed when an incoming or outgoing call process is set up for the first subscriber identity card or the second subscriber identity card.

5. The method as claimed in claim 1, wherein the integrated status indicator indicates that no call is being held when no call is held for any of the first subscriber identity card and the second subscriber identity card.

6. A method for handling a Hands-Free device by an Audio Gateway device with a first inserted subscriber identity card and a second inserted subscriber identity card, comprising:
    obtaining an event signal indicating that a status corresponding to the first subscriber identity card or the second subscriber identity card has been updated;
    caching information indicating that the updated status corresponds to one of the first or second subscriber identify card subscriber identity card;
    providing a status update report to the Hands-Free device via an unsolicited result code which comprises a status indicator corresponding to the updated status;
    receiving a command after providing the status update report, which is issued by the Hands-Free device; and
    performing a first operation associated with one of the first and the second subscriber identity cards indicated by the cached information.

7. The method as claimed in claim 6, wherein the Hands-Free device configures a second operation mapping to a button of the Hands-Free device when the status update report is received, and issues the command after the button is pressed.

8. The method as claimed in claim 6, wherein the status indicator indicates that an incoming call request has been received, the cached information indicates that an incoming call request has been received from a cell that one of the first and second subscriber identity cards camps on, and the first operation is performed to answer an incoming call via the same cell in response to the incoming call request according to the cached information.

9. The method as claimed in claim 6, wherein the status indicator indicates that no call is active, and the first operation is performed to dial a last dialed number via a preferred subscriber identity card or the last dialed subscriber identity card according to the cached information.

10. The method as claimed in claim 6, wherein the status indicator indicates that there is an outgoing call, the cached information indicates the outgoing call is made with which subscriber identity card, and the first operation is performed to abort the outgoing call with the subscriber identity card indicated by the cached information.

11. The method as claimed in claim 6, wherein the status indicator indicates that there is a active call and there is a waiting call or a held call, the cached information indicates that the active call is associated with the first subscriber identity card and the waiting call or the held call is associated with the second subscriber identity card, and the first operation is performed to release or hold the active call with the first subscriber identity card and retrieve the waiting call or the held call with the second subscriber identity card according to the cached information.

12. The method as claimed in claim 6, wherein the status indicator indicates that there is an active call and there is a waiting call or a held call, the cached information indicates that there is an active call for the first subscriber identity card or the second subscriber identity card and there is a waiting VOIP call or a held VOIP call through Internet, and the first operation is performed to release or hold the active call via the first subscriber identity card or the second subscriber identity card and retrieve the VOIP call via a Wi-Fi module according to the cached information.

13. A system for handling a Hands-Free device, in which comprises a first inserted subscriber identity card and a second inserted subscriber identity card, comprising:
a processor receiving a command from the Hands-Free device, wherein the Hands-Free device issues the command to request a status report of the Audio Gateway device, collecting a first status of the first subscriber identity card for the received command, collecting a second status of the second subscriber identity card for the received command, generating an integrated status indicator according to the collected first and second statuses, and providing a status report to the Hands-Free device via a result code in response to the command, wherein the result code comprises the integrated status indicator.

14. The system as claimed in claim 13, wherein the integrated status indicator indicates that no service is available when no access network is being camped on by any of the first subscriber identity card and the second subscriber identity card, and indicates that a service is available when at least an access network is being camped on by at least one of the first subscriber identity card and the second subscriber identity card.

15. The system as claimed in claim 13, wherein the integrated status indicator indicates that there is no active call when no call is active for any of the first subscriber identity card and the second subscriber identity card, no call is being processed when no incoming or outgoing call process is being set up for the first subscriber identity card and the second subscriber identity card, and no call is being held when no call is held for the first subscriber identity card and the second subscriber identity card.

16. The system as claimed in claim 13, wherein the processor provides a status update report to the Hands-Free device via an unsolicited result code when an event signal indicating a status corresponding to the first subscriber identity card or the second subscriber identity card has been updated, and caches information indicating that the status corresponds to one of the first or second subscriber identity card, wherein the unsolicited result code comprises the updated status.

17. The system as claimed in claim 16, wherein the Hands-Free device configures a first operation mapping to a button of the Hands-Free device according to the status update report, and issues an AT command by executing the first operation after the button is pressed, and the processor receives an AT command from the Hands-Free device after providing the status update report, and performs a second an operation according to the AT command, wherein the operation is performed with one of the first and the second subscriber identity cards indicated by the cached information.

18. The system as claimed in claim 17, wherein the operation is performed to answer an incoming call via a cell that one of the first and second subscriber identity cards camps on when the cached information indicates that an incoming call request from the cell has been received, or to dial a last dialed number with a preferred subscriber identity card or the last dialed subscriber identity card when the cached information indicates that no call is active for any of the first subscriber identity card and the second subscriber identity card, or to abort an outgoing call with one of the first and second subscriber identity cards when the cached information indicates that the outgoing call is ongoing.

19. The system as claimed in claim 17, wherein the cached information indicates that there is a active call for the first subscriber identity card and there is a waiting call or a held call for the second subscriber identity card, and the operation is performed to release or hold the active call with the first subscriber identity card and retrieve the waiting call or the held call with the second subscriber identity card.

20. The system as claimed in claim 17, wherein the cached information indicates that there is a active call for the first subscriber identity card or the second subscriber identity card and there is a waiting VOIP call or a held VOIP call through Internet, and the operation is performed to release or hold the active call with the first subscriber identity card or the second subscriber identity card and retrieve the VOIP call with a Wi-Fi module.

* * * * *